Patented Mar. 1, 1927.

1,619,692

UNITED STATES PATENT OFFICE.

LAWRENCE E. BARRINGER, OF SCHENECTADY, AND CHARLES F. PETERSON, OF SCOTIA, NEW YORK, ASSIGNORS TO GENERAL ELECTRIC COMPANY, A CORPORATION OF NEW YORK.

PROCESS OF MAKING MOLDED COMPOSITIONS.

No Drawing. Original application filed September 13, 1922, Serial No. 588,079. Divided and this application filed April 10, 1925, Serial No. 22,213. Renewed July 26, 1926.

The present invention relates to composite insulation containing mica and it is the particular object of our invention to provide mica compositions having improved physical and electrical properties.

The so-called "pasted mica" consisting of plates or flakes of mica bonded together, has for many years been made by the use of a binder of natural gum, such as shellac or copal. Attempts have been made from time to time to use other binders but none have proved as suitable as shellac. However, shellac softens at comparatively low temperature (about 65° to 70° C.) and decomposes as the temperature increases, decomposition setting in rapidly between 175 and 200° C., hence certain disadvantages accompany its use.

In assembly operations of commutators, temperatures as high as 300 to 350° C. may be reached, for instance, when commutators are immersed in molten tin during the "tinning" operation. Thus mica plates and cones used in commutator-construction may be subjected to temperatures sufficiently high to cause the shellac to ooze out from the mica composition between the copper segments. At higher temperatures this escaped shellac when carbonized or decomposed may cause short circuits. When not actually carbonized partial decomposition of the shellac will yield decomposition products through destructive distillations which are deposited upon the various parts of the commutator and which are not only conductive in themselves but attack the copper and form additional deleterious non-insulating substances. Even when the shellac does not escape, its softening will cause sliding of the mica plates when under pressure. In commutator construction, this displacement of the mica plates will leave the commutator bars loose. It has been attempted to overcome these difficulties by using a phenolic condensation product as a binder for composite mica articles but it was found this material would not adhere to mica with sufficient tenacity, nor bond mica plates together sufficiently well to form an adequately dense and strong insulation. Phenolic condensation products also carbonize rather readily.

We have discovered that esters of polyhydric alcohols fulfill all of the exacting conditions requisite for binders in mica compositions both physical and electrical and adhere with such tenacity to mica that cemented mica articles formed thereby ring when struck as though made of steel while at the same time being sufficiently thermoplastic even when fully cured to yield somewhat at high temperatures so as to be moldable sufficiently to permit some shaping of the mica articles during assembly as parts of electrical machinery, or other structures.

In our present divisional application we have claimed a novel method of making molded articles with a polymerizable binder and in particular with a resin made from a polyhydric alcohol and a polybasic acid.

We prefer to use the reaction product of glycerine and phthalic anhydrid described in Callahan Patent 1,108,329 in the soluble, fusible condition characteristic of the first stage of the reaction. Conveniently the ester is applied as an acetone solution to the surface of the mica plates and is drawn in between the laps of the mica films by capillary force. In some cases we may build up the mica plates with dry mica flakes to the required thickness and introduce the binder solution between the laminae by immersing the plates in the solution and thus depend entirely on the capillary force to distribute the binder.

In the manufacture of built-up mica articles as for example, commutator cones, a stack of sheet material is first made as above described. After evaporation of the acetone solvent this sheet material is heated in a press to a temperature of approximately 175° C. At this temperature reaction takes place in the glycerine ester, as described in the Patents No. 1,108,329 and No. 1,108,330, which if continued will result in the ester becoming hard, infusible and insoluble. As it is not desired that the ester assume the infusible state before the article of mica has been shaped, the heating is discontinued while the binder is still in an intermediate thermoplastic state.

In this condition the plate is subjected to machining operations to preform blanks or developed shapes of the mica articles which we may desire to make. These developed shapes are then formed and put into molds which have been heated to 250° C., and at once put in a press which presses the mica into its final form. The molds and mica compositions are then taken out of the press and placed in an oven maintained at about 300° C. for sufficient length of time to polymerize the binder. No hard and fast molding and polymerizing temperatures for preforming and for polymerizing can be given which will apply to all cases. However, the temperature range in general varies within 100° to 300° C., the lower temperatures of this range being adapted for the preliminary curing and the higher temperatures for the final hardening operation. The molds are then taken out, again placed in a press and held under pressure until cooled off either by the natural loss of heat or by artificial cooling. In some cases articles not molded are subjected to a special heating treatment to cure same.

The resulting article is mechanically stronger than an article produced by the use of shellac as a binder, and there is no tendency for the mica plates to slip over each other when the composite mica is subjected to high temperature nor for mica insulating parts, as tubes, to collapse under heat as will occur with shellac-pasted articles.

The binding or bonding material described is insoluble in water and mineral oil after it has been hardened by the proper treatment under heat and pressure and therefore the mica insulations produced with this material are resistant to both water and mineral oils.

The electric insulating properties are superior to shellac pasted mica. Articles, produced in accordance with our invention may be subjected to the high temperatures encountered in the manufacture and operation of electric apparatus without deterioration or decomposition of binder.

For example, in some cases it is desired to subject such electric apparatus to the temperature of molten tin. It has been found that mica articles made as above described may be held in a tin bath at a temperature of 300° C. or even higher for six to seven minutes without injury. At these high temperatures the glycerine resin or ester instead of becoming soft and letting go its hold upon the mica, tends to become even harder and stronger if it has not already been converted into the final, infusible stage.

Although we have described the above specific embodiment of our invention as applied to composite mica articles in which mica scales are arranged to form distinct laminæ, we wish that it be understood that various modifications may be made within the scope of our invention. For example, mica powder or fine mica flakes may be mixed with a glycerine ester to form a mechanically strong, hard and tough material having valuable insulating properties. In this case the binder preferably is mixed in a finely divided condition with the mica particles, the proportions depending on the character desired in the final product. This mixture of powdered materials is subjected to heat and pressure to convert the resin into the hard, infusible state. The resin may be converted to advantage partially to the final stage before comminuting and mixing with the mica powder thereby correspondingly shortening the time required for curing.

In some cases the mixture of powdered mica and powdered resin may be compressed cold with or without a small quantity of solvent into the form of billets or slabs. These billets may be cut into blanks preparatory to pressing and finally pressed or molded at a temperature sufficiently high to soften the binder.

While we have described our invention with particular reference to the utilization of a phthalic resin, we can utilize resins containing other polybasic acids, depending on the property desired of the product. For example, a more flexible product may be made using a malic acid resin. In a similar way resins may be used consisting of the reaction product of a mixture of polybasic acids and glycerine or other polyhydric alcohol or mixture of polyhydric alcohols.

What we claim as new and desire to secure by Letters Patent of the United States, is:

1. The process of making molded articles which consists in applying to the materials to be molded a resinous, fusible ester of a polybasic acid and a polyhydric alcohol, forming a blank of said composition, heating to a temperature sufficiently high to partially polymerize said ester, fashioning said blank to desired form and continuing the polymerization of the ester while molding under pressure.

2. The process of making mica compositions which consists in coating mica fragments with a resin comprising a compound of a polyhydric alcohol and a polybasic acid in the fusible stage, forming blanks therefrom, heating the same under pressure, the temperature being sufficiently high to convert said resin to a partially polymerized condition, cutting said blanks to desired form and thereupon heating the formed product to further polymerize the resin.

3. The process of making composite articles which consists in applying to the materials to be shaped a fusible resinous ester of phthalic anhydride and glycerine, preforming blanks from the resulting mixture under such conditions of temperature and time that said ester is partially converted to the nonfusible condition, fashioning said blanks to desired shape, molding the product under pressure at a temperature at which further conversion of said ester occurs, and finally cooling the product while under pressure.

4. The process of making articles of sheet mica which consists in applying a resin comprising a product of glycerine and phthalic anhydride to mica plates, forming blanks of desired thickness, heating the resulting product until the resin is partially transformed to the infusible state, preforming the blanks and then molding the same under heat and pressure.

5. The process of making articles comprising superimposed mica flakes which consists in applying to said superimposed flakes a polymerizable reaction product of a polyhydric alcohol and a polybasic acid, heating to partially harden said product, preforming the coated flakes and converting the product at a higher temperature and while under pressure to a hard, infusible condition.

6. The process of making mica sheet composition from mica flakes which consists in building up plates from flake mica, together with a binder comprising a compound of glycerine and phthalic anhydride, heating said plates under pressure to about 175° C. to partially polymerize said compound, heating said plates in a confined space to about 250° C., until the polymerization of the binder is complete and cooling said product to room temperature while under pressure.

7. The process of making mica compositions from mica fragments which consists in applying a resinous reaction product of glycerine and phthalic anhydride in the fusible state to said fragments, forming blanks therefrom under pressure at a sufficiently high temperature to partially convert said resinous product to the infusible state, shaping said blanks into desired form, completing the conversion under pressure and finally cooling said product while under pressure.

8. The process of making mica compositions from mica flakes with a binder of a reaction product of glycerine and phthalic anhydride which consists in carrying out the forming of said materials while said binder is in a fusible state, hardening said binder under pressure at a temperature of about 250° C. and finally cooling said material while under pressure.

9. The process of making mica compositions which consists in applying to mica a fusible resinous condensation product of phthalic anhydride and glycerine, forming blanks therefrom under such conditions of temperature and time that partial conversion of said condensation product to the infusible state occurs, fashioning said blanks to desired form, then molding the formed objects at about 250° C., removing the molded objects from the mold and completing the conversion of the binder to the infusible state by heating said objects at a temperature of about 300° C.

10. The process of making mica compositions which consists in mixing finely comminuted mica with a fusible polyhydric alcohol-polybasic acid resin in a finely divided state, pressing the mixture to form blanks, shaping said blanks into desired form and finally molding at a sufficiently high temperature to convert said resin to the infusible state.

11. The process of making mica compositions from powdered mica and polyhydric alcohol-polybasic acid resin which consists in mixing said resin with the mica in the powdered state while partially converted from the fusible to the infusible state, forming blanks from said mixture, and finally molding at a sufficiently high temperature to complete the conversion of the resin to the infusible state.

In witness whereof, we have hereunto set our hands this 9th day of April, 1925.

LAWRENCE E. BARRINGER.
CHARLES F. PETERSON.